United States Patent [19]
Hatfield

[11] Patent Number: 5,522,029
[45] Date of Patent: May 28, 1996

[54] FAULT TOLERANT RENDEZVOUS AND SEMAPHORE FOR MULTIPLE PARALLEL PROCESSORS

[75] Inventor: Craig E. Hatfield, Goldvein, Va.

[73] Assignee: International Business Machines Corporation, Armonk, N.Y.

[21] Appl. No.: 437,561

[22] Filed: May 9, 1995

Related U.S. Application Data

[63] Continuation of Ser. No. 53,022, Apr. 23, 1993, abandoned.
[51] Int. Cl.$^6$ .............................. G06F 11/00; G06F 13/14
[52] U.S. Cl. ................. 395/181; 395/182.1; 395/182.18; 395/740
[58] Field of Search ..................... 395/725, 575, 395/500

[56] References Cited

U.S. PATENT DOCUMENTS

| | | | |
|---|---|---|---|
| 4,369,494 | 1/1983 | Bienveno et al. | 395/550 |
| 4,589,066 | 5/1986 | Lam et al. | 364/200 |
| 4,665,522 | 5/1987 | Lala et al. | 371/36 |
| 4,975,833 | 12/1990 | Jinzahi | 395/425 |
| 4,989,131 | 1/1991 | Stone | 364/200 |
| 5,050,072 | 9/1991 | Earnshaw et al. | 395/325 |
| 5,261,106 | 11/1993 | Lentz et al. | 395/725 |
| 5,276,886 | 1/1994 | Dror | 395/725 |
| 5,307,483 | 4/1994 | Knipfer | 395/575 |

Primary Examiner—Gopal C. Ray
Assistant Examiner—Jeffrey K. Seto
Attorney, Agent, or Firm—Whitham, Curtis, Whitham & McGinn; Kenneth Seaman

[57] ABSTRACT

A rendezvous technique makes use of a semaphore that operates independently of its initial value. All participating programs (or processors) write this semaphore before reading it; therefore, the semaphore is reinitialized as it is used regardless of which program accesses it first. Initialization with use allows this semaphore to be used at any time without regard to previous use or data corruption. One master program initializes the semaphore's data and then sets a flag indicating the data's validity. The master program then continues to set the valid flag until the data shows the rendezvous' completion. The other participating programs first set the semaphore valid flag to invalid (before or after the master program sets it) and wait until the flag transitions from invalid to valid. At that time they will atomically manipulate the data. After each program has modified the semaphore's data, it indicates the completion of the rendezvous.

1 Claim, 6 Drawing Sheets

Slave Program Flow

Data in Shared Memory

COUNT

Initial Value is Unknown 0 1 2 3 4 5 6 7 8 9 A B C D E F

Example, N = 3

5,522,029

FAULT TOLERANT RENDEZVOUS AND SEMAPHORE FOR MULTIPLE PARALLEL PROCESSORS

This is a Continuation of application Ser. No. 08/053,022 filed Apr. 23, 1993, now abandoned.

DESCRIPTION

Background of the Invention

1. Field of the Invention

The present invention generally relates to multiple processor computer systems and, more particularly, to a method for closely synchronizing software on multiple processors with private memory and uninitialized shared memory.

2. Description of the Prior Art

Fault tolerant systems are currently a subject of much research and energy. Fault tolerant systems are expected to work through errors and recover the system to an operational state. These systems need to be started and restarted. Sometimes they will be started with memory which has been corrupted by machine errors. Closely synchronizing startup of software on multiple processors with private memory and uninitialized shared memory has been a problem in the prior art. The goal is to allow multiple programs (or processors) to rendezvous, either at initial startup or after a power outage. A rendezvous is a point in software from which the program cannot progress without specific conditions being met by other programs. The software to be synchronized may be running on a plurality of different processors in parallel and the memory shared between them may be corrupted from previous operations. To allow very close synchronization of the processors at startup, it is desirable to use a flag in shared memory which, when set to a specific value, would allow the software in each processor to continue. What is needed is to allow any value to exist in the flag before the rendezvous, even the "continue" value, without invalidating the rendezvous process. In addition, there could be more than two processors running at different speeds involved in the process.

Previously, two other methods were used to synchronize the startup of the real time operating system (RTOS) on multiple processors. A RTOS is a multi-tasking operating system which supports asynchronous application programs running on one or multiple processors. When multiple processors are involved, it is necessary to synchronize the startup of the RTOS on the multiple processors. One way this has been done is to set a specific flag to true when ready, and when all flags are set, all processors continue. The problem with this approach is that when restarting without reloading the RTOS results in some flags being set before the processors are ready. Another approach is to use a loader in read only memory (ROM) to start the RTOS simultaneously after loading all processors. The problem with this approach, however, is that it is not possible to restart the system without reloading all the processors and that the processors cannot be synchronized further along in the startup procedure.

SUMMARY OF THE INVENTION

It is therefore an object of the present invention to provide a method that allows multiple programs (or processors) to rendezvous at a point in software from which the program cannot progress without specific conditions being met by other programs.

It is another object of the invention to provide a technique that allows very close synchronization of the processors in a multi-processor system at startup.

It is another, more specific object of the invention to provide a rendezvous technique that makes use of a semaphore that operates independently of its initial value.

A semaphore is conventionally defined as an integer with two possible operations: WAIT (or P) which loops (or is suspended) until the semaphore is greater than zero and then decrements it. SIGNAL (or V) which merely increments the semaphore. The present invention expands on this definition. More particularly, all participating programs (or processors) write this semaphore before reading it; therefore, the semaphore is reinitialized as it is used regardless of which program accesses it first. Initialization with use allows this semaphore to be used at any time without regard to previous use or data corruption.

One master program initializes the semaphore's data and then sets a flag indicating the data's validity. The master program then continues to set the valid flag until the data shows the rendezvous' completion. The other participating programs first set the semaphore valid flag to invalid (before or after the master program sets it) and wait until the flag transitions from invalid to valid. At that time, they will automatically manipulate the data. After each program has modified the semaphore's data, it should indicate the completion of the rendezvous.

The subject invention allows the processors to be restarted during initialization or even during the rendezvous itself, and this technique will still work after the restart. It provides a semaphore that is usable no matter what events have occurred prior to the rendezvous. This is a technique which could be applied to any semaphore which needs protection from external events, such as defective software, radiation, or other external hazards.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
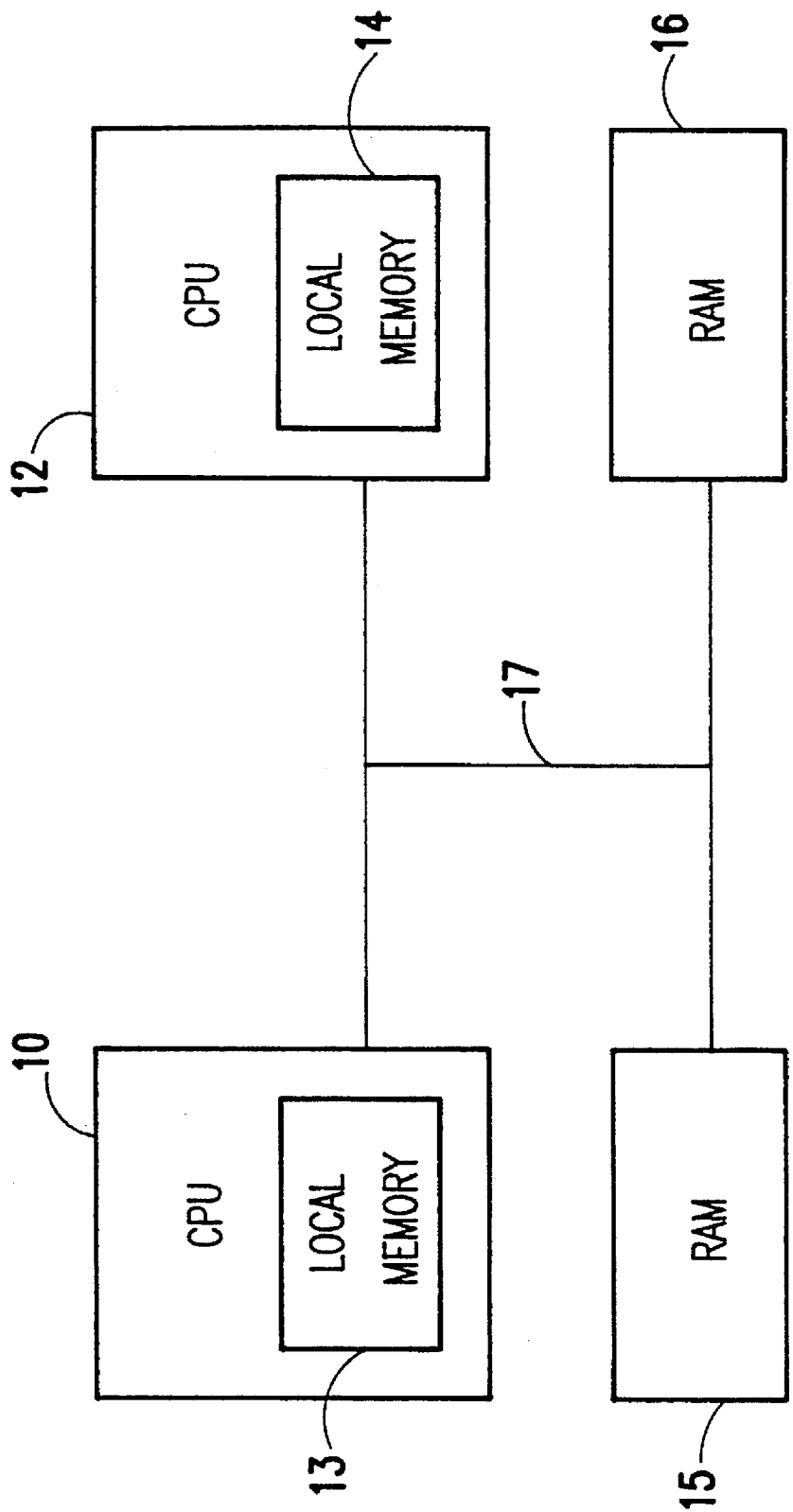
FIG. 1 is a block diagram showing a multiple processor system, including both private memory and shared memory, on which the subject invention may be implemented.

Referring now to the drawings, and more particularly to FIG. 1, there is shown a multiprocessor system on which the subject invention may be implemented. The system shown includes, for the sake of simplicity, two central processing units (CPUs) 10 and 12, each having private memory 11 and 13, respectively; however, it is to be expressly understood that the invention is applicable to any number of processors. In addition, one or more banks of shared memory 15 and 16 are connected to CPUs 10 and 12 by means of a bus 17.

The CPUs 10 and 12 may include, for example, microprocessors such as Intel i386 or i486 or Motorola 68030 or 68040 microprocessors or various commercially available RISC (for reduced instruction set computer) microprocessors. Alternatively, the CPUs may be part of a main frame computer, such as IBM's System/390. In any case, the software running on the system runs on the CPUs 10 and 12 in parallel and needs to be synchronized. If the software needs to be restarted, there is a problem in that the data in the memories 15 and 16 shared between them may be corrupted from previous operations.

According to the invention, one processor or program is designated as the "Master" or controller. In a preferred embodiment of the invention, the system master is chosen by a standard bus arbitration. The number of processors or programs participating in the rendezvous must be known by the Master. This may be accomplished, for example, by a processor trying to communicate with every bus address, recording the address of each processor that it detects.

Figure 2:
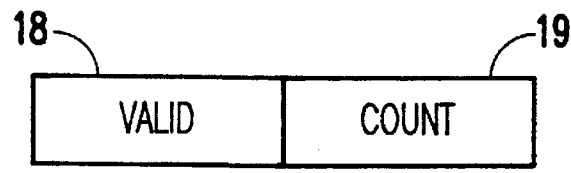
FIG. 2 is a block diagram showing the VALID and COUNT data in shared memory of the system shown in FIG. 1.

The semaphore is shown in FIG. 2 and is stored in shared memory. The semaphore includes a VALID field 18 and a COUNT field 19. The location of the semaphore must be known. For example, it can be located at a predetermined offset from the beginning of shared memory.

Figure 3:
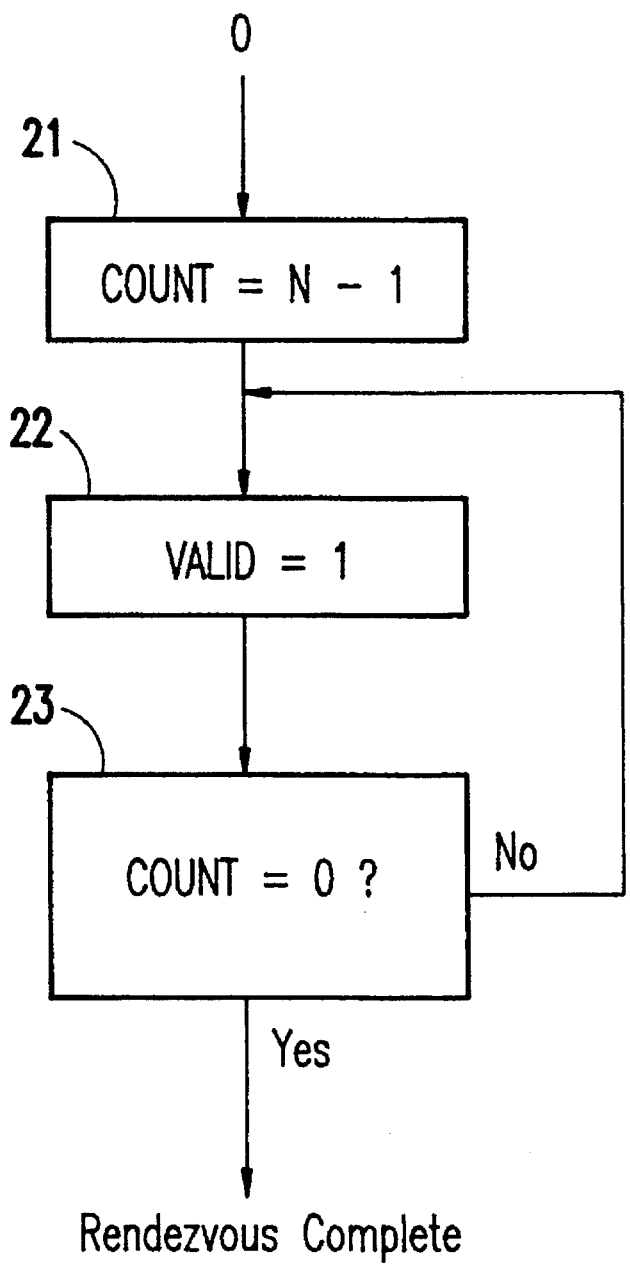
FIG. 3 is a flowchart showing the logic of the master program flow in the practice of the invention.

With reference to FIG. 3, the Master program flow begins in function block 21 by setting the COUNT in the COUNT field 19 to N-1, where N is the number of processors in the system. Then the Master sets the VALID field 18 in function block 22 to 1. A test is then made in decision block 23 to determine if the COUNT field 19 is zero, and if not, the process loops back to function block 22; otherwise, the rendezvous is complete.

Figure 4:
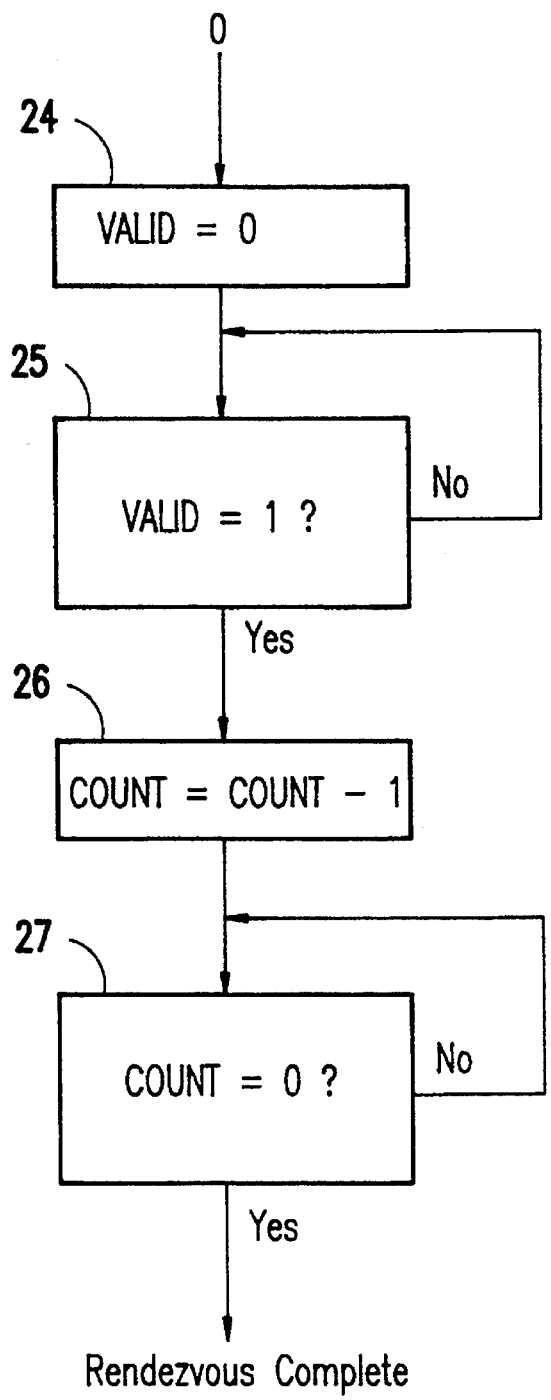
FIG. 4 is a flowchart showing the logic of the slave program flow in the practice of the invention.

The corresponding Slave program flow is shown in FIG. 4 where, in function block 24, the VALID field 18 is set to zero. A test is then made in decision block 25 to determine if the VALID field has been set to 1. If not, the program enters a wait state, but if the VALID field has been set to 1, the Slave decrements the COUNT field 19 in function block 26. A test is then made in decision block 27 to determine if the COUNT field is zero. If not, the program enters a second wait state, but if the COUNT field 19 is zero, the rendezvous is complete.

The tightness of the semaphore check loop, i.e., decision block 23 and decision block 27 in FIGS. 3 and 4, respectively, allows very close synchronization by the rendezvous. In a specific implementation of the invention, two microprocessors using this technique synchronized their Real-Time-Clocks to within one tick (ten microseconds). No program need be distinguished from any other except the master program. This eliminates the need to assign unique IDs or indices to programs solely for use in a rendezvous.

In the case of parallel processors shown in FIG. 1, some kind of atomic Read-Modify-Write operation must be available in shared memory, at the memory location level. In the illustrated embodiment, multiple processors running in parallel require the use of an atomic decrement to perform the "COUNT=COUNT-1" step in function block 26. This is to avoid the situation where one CPU reads the COUNT field 19 and decrements its copy, another CPU reads the COUNT field 19 and decrements its copy, the first CPU writes its copy to the COUNT field 19, and then the second CPU writes its copy to the COUNT field 19. Now both CPUs have decremented COUNT, but COUNT is only COUNT-1 instead of COUNT-2, as it should be when both CPUs decrement the COUNT. Thus, each CPU must be allowed to read, decrement, and write the new value of COUNT before another CPU is allowed to read COUNT. This is what is meant by an "atomic decrement".

Figure 5A:
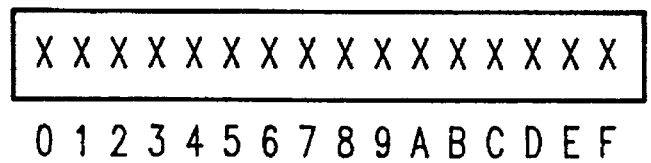
FIGS. 5A and 5B are, respectively, block diagrams relating to a specific implementation of the invention showing an initial value of the COUNT field and an example of the COUNT field where N=3.
Figure 5B:
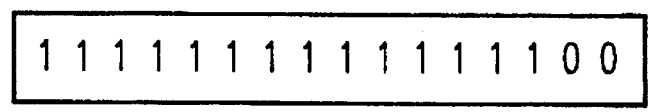

In a specific implementation of the invention, only one atomic Read-Modify-Write operation for shared memory, Test-and-Set Bit, was available. In order to use this technique, the Test-and-Set Bit instruction had to be used to modify COUNT. COUNT was implemented as the number of zero bits in the COUNT location. This is illustrated in FIGS. 5A and 5B. More specifically, in FIG. 5A, the COUNT field 19 is shown as a 16-bit field, where bit 0 is the most significant bit (MSB). The initial value of the COUNT field is unknown, and so in FIG. 5A, the COUNT field is represented by a series of "Xs". Assume for example that the number of CPUs is three, i.e., N=3, then following the convention of using the number of zero bits to record the number of CPUs, the COUNT field is as shown in FIG. 5B.

Figure 6:
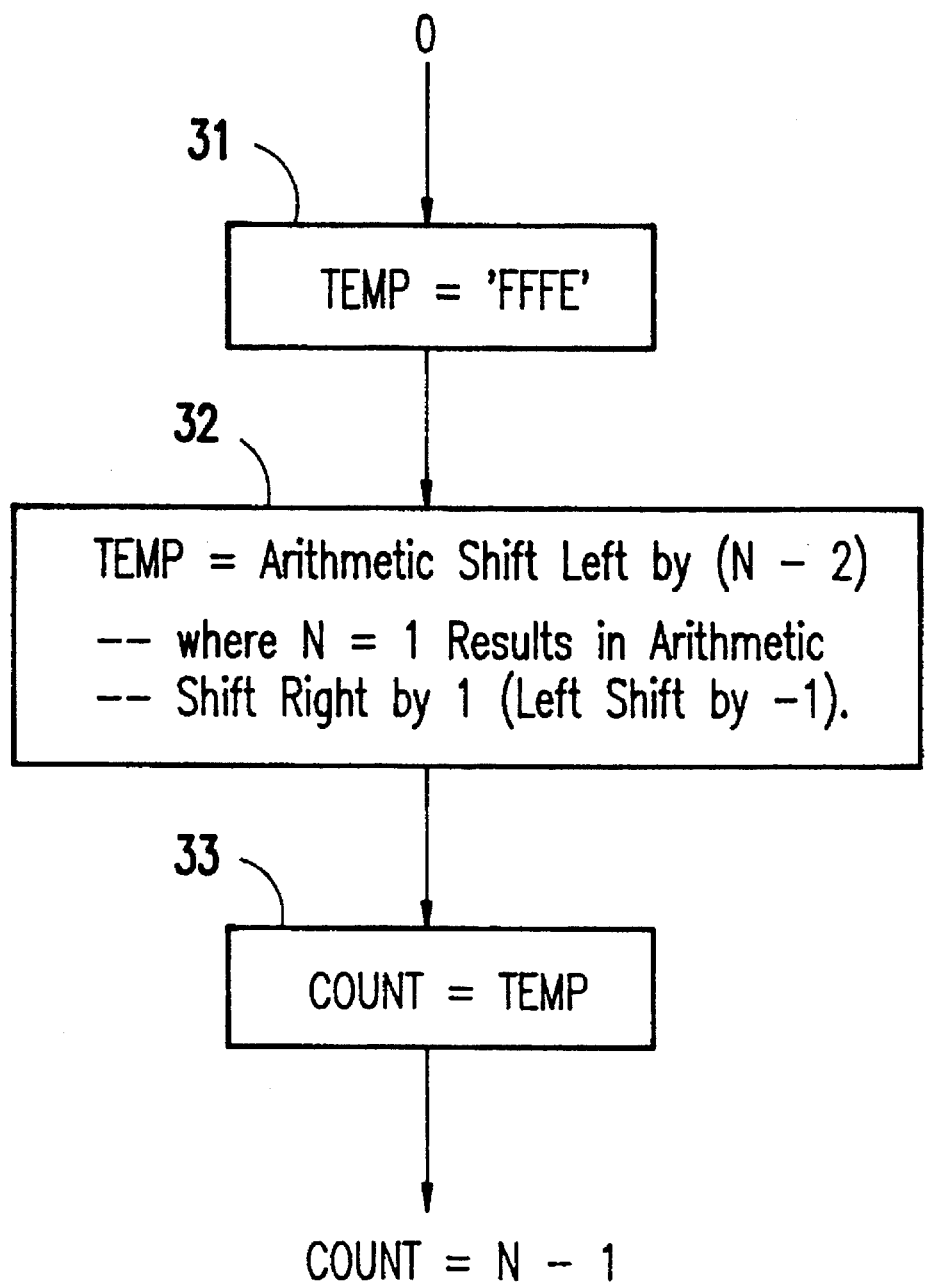
FIG. 6 is a flowchart showing the logic of the master program Set COUNT for the specific implementation of the invention.

Now, with reference to FIG. 6, the Master program Set COUNT begins in function block 31 by storing the hexidecimal value "FFFE" in a register identified as TEMP. Next, in function block 32, the value in register TEMP is shifted left by N-2, where N=1 results in an arithmetic shift right by one (i.e., a left shift by −1). The resulting value in register TEMP is stored in the COUNT field 19 in function block 33, this value being equal to N-1.

Figure 7:
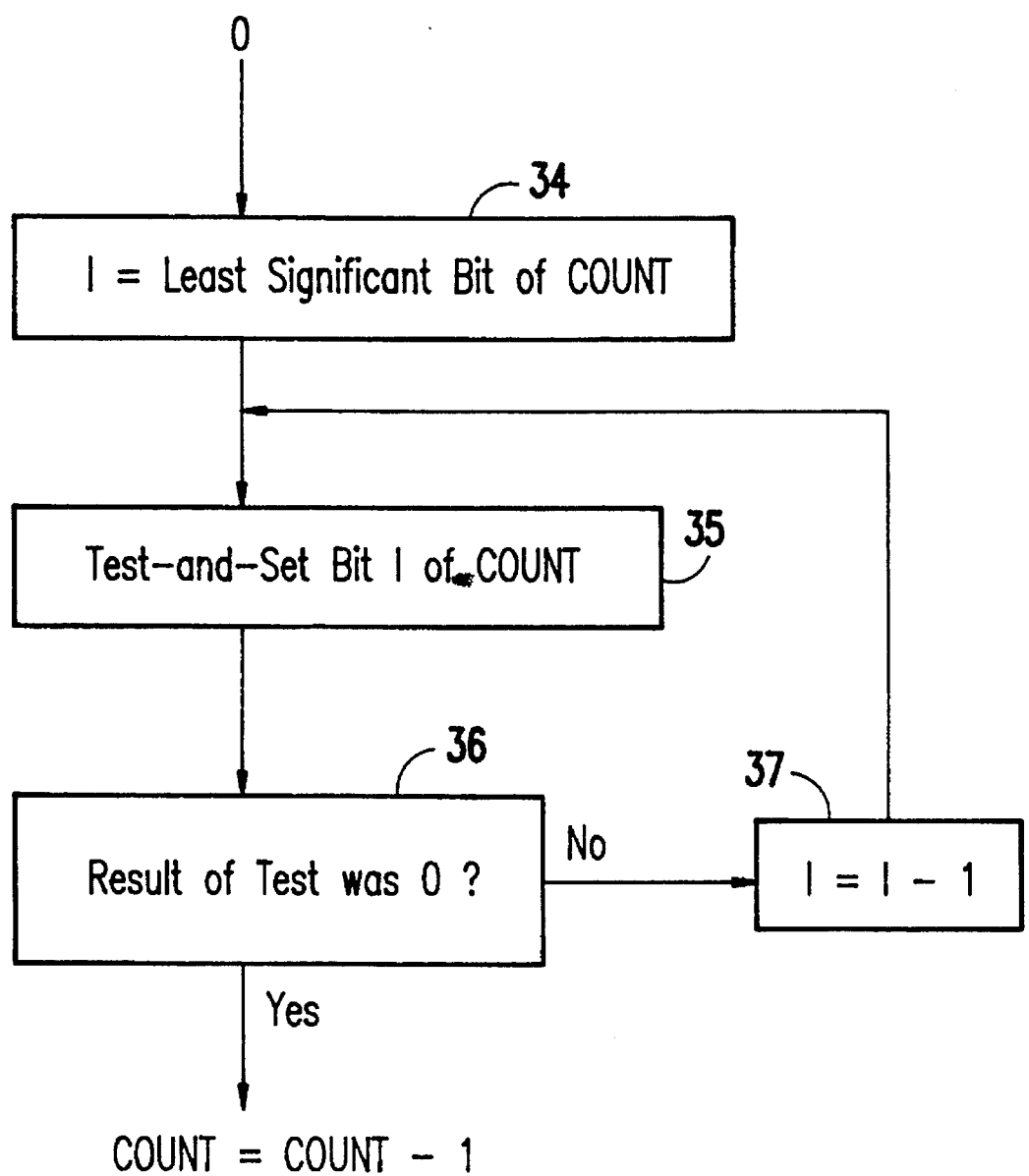
FIG. 7 is a flowchart showing the logic of the program Decrement COUNT with Test-and-Set for the specific implementation of the invention.

The Slave uses the Test-and-Set to perform the "atomic decrement" in the program Decrement COUNT shown in FIG. 7. Bit I is defined as the LSB of the COUNT field in function block 34. The Test-and-Set Bit instruction is used for bit I in function block 35. A test is then made in decision block 36 to determine if the result of the Test-and-Set Bit instruction was zero. If not, bit I is decremented (set to zero) in function block 37, and the process loops back to function block 35; otherwise, the operation yields the desired operation, that is, the decrementing of the COUNT field 19 by one.

By starting with the least significant bit (LSB), the error condition caused by changing the sign bit (MSB) with a left arithmetic shift is not possible until N exceeds the number of bits in the COUNT field 19. No processor is responsible for a particular bit in the COUNT field, so no additional knowledge, such as a processor identification (CPU ID), is required.

The VALID and COUNT fields can have any value prior to execution of this procedure without invalidating the results. Only the program designated as Master needs to know the number of participating processors or programs. No processor or program reads a value without first writing a value. Specifically, no program reads the COUNT or VALID fields before writing to the VALID field. See function block 22 and 25 in FIGS. 3 and 4, respectively. Depending on the implementation of the decrement and the loop which checks the value of the COUNT field 19, parallel processors can be synchronized to within three Assembly instructions. Once written, the COUNT field 19 is treated as a standard semaphore. This semaphore can be used or reused at any time without regard to the state of shared memory. This is particularly important in systems where some memory may not be initialized before the rendezvous, the rendezvous may be repeated as a result of an external, asynchronous event, or memory may be corrupted by an external event such as radiation.

All alternate approaches require the use of the VALID flag and the requirement that it does not indicate validity until the transition from invalid to valid is detected. Liberty may be taken with the handling of the data portion of the semaphore, COUNT in this case, as long as it is modified atomically.

It is also possible to use one flag for each possible participating program. Then all programs would wait until all flags are set before continuing. This approach could replace the atomic "Decrement and Check COUNT" portion of the technique without losing any function, but it would require more instructions to test the exit condition resulting in greater variance in the times when each program leaves the rendezvous. This approach also requires each program to modify a unique location and increased storage for the additional flags.

A better alternate approach would be to add another level of protection on COUNT. After detecting the zero-to-one transition of VALID, each slave would access COUNT after doing a Test-And-Set on a bit in a third location. The third location would then act as a standard semaphore protecting COUNT. The following pseudocode illustrates the process:

```
Master:  COUNT = N–1        Slave:  VALID = 0
         PROTECT = 0                Loop until VALID = 1
         Loop until                 Loop until Test_And_Set
            COUNT = 0                  (PROTECT) = 0
         VALID = 1                  TEMP = COUNT
         End loop                   TEMP = TEMP – 1
                                    COUNT = TEMP
                                    PROTECT = 0
                                    Loop until COUNT = 0
```

In addition to synchronization, the technique according to the invention can be used for protection. For example, the Operating System may be restarted for a variety of reasons, all involving recovery from an error. The memory may be corrupt or not initialized. A system master may be required to verify the system configuration information and then distribute it to all of the other processors. This technique is used to protect the configuration information until it is ready to be read by the other processors. The following pseudocode illustrates the process:

A modified SIGNAL (S) could verify the semaphore's validity—

S.DATA=0

S.VALID=1

Loop

Do productive work

SIGNAL (S. DATA)

S.VALID=1

End loop

A modified WAIT (S) could wait for validity—

S.VALID=0

Loop until S.VALID=1

WAIT (S.DATA)

For example, in a multitasking operating system, the kernel acts as the monitor program. That is, it initializes all system semaphores and then controls access to them. Using the technique according to the invention, the kernel need not initialize semaphores or even control access to them. It may be desirable, but their integrity does not require it.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A rendezvous for synchronizing multiple programs in a multiprocessor system having memory shared by each processor, comprising the steps of:

storing in shared memory a semaphore having a count field and a valid field;

designating one of said processors as a master, and designating all other processors as slaves;

writing the semaphore's count field to N-1 by the master processor, regardless of the semaphore's prior value in the count field, wherein N equals the number of processors and programs in the multiprocessor system that need to be synchronized;

writing the semaphore's valid field to valid by the master processor indicating the validity of the semaphore's count field;

writing the semaphore's valid field to invalid by at least one slave processor, said at least one slave processor then waiting until the semaphore's valid field transitions from invalid to valid;

checking by the master processor the semaphore count field for an indication that the rendezvous is complete, and, if not, writing the semaphore's valid field to valid;

decrementing by one the semaphore's count field by said at least one slave processor when a transition of the semaphore's valid field from invalid to valid is detected;

checking by other slave processors the semaphore count field for a zero count as an indication of the completion of the rendezvous after decrementing the semaphore's count field;

rewriting the semaphore's count field to N-1 and the semaphore's valid field to valid by the master processor in the event a restore process is initiated following a system failure, regardless of the semaphore's prior value in the count field, wherein if any slave processor arrives at the semaphore prior to the master processor after restart, the slave processor writes the semaphore's valid field to invalid, thereafter waiting until the semaphore's count field is written to N-1 and the semaphore's valid field is written to valid by the master processor; and repeating, in the event a restart process is initiated, the steps of decrementing by one the semaphore's count field by a slave processor when a transition of the semaphore's valid field from invalid to valid is detected, and checking by other slave processors the semaphore field for a zero count as an indication of the completion of the rendezvous after decrementing the semaphore's count field.

* * * * *